United States Patent [19]

Kajiwara

[11] Patent Number: 4,732,199

[45] Date of Patent: Mar. 22, 1988

[54] RADIAL TIRE FOR HIGH INTERNAL PRESSURE

[75] Inventor: Shinzou Kajiwara, Kobe, Japan

[73] Assignee: Sumitomo Rubber Industries, Ltd., Japan

[21] Appl. No.: 865,277

[22] Filed: May 21, 1986

[30] Foreign Application Priority Data

May 21, 1985 [JP] Japan .................................. 60-108686

[51] Int. Cl.$^4$ ............................ B60C 9/13; B60C 9/08
[52] U.S. Cl. ....................................... 152/557; 152/531; 152/560
[58] Field of Search ............... 152/526, 531, 548, 557, 152/558, 560, 536

[56] References Cited

U.S. PATENT DOCUMENTS

| | | | |
|---|---|---|---|
| 4,177,852 | 12/1979 | Merli et al. ..................... | 152/557 X |
| 4,258,773 | 3/1981 | de Saint-Michel ............. | 152/560 X |
| 4,371,025 | 2/1983 | Canevari et al. ................ | 152/527 X |
| 4,445,560 | 5/1984 | Musy .............................. | 152/527 X |

FOREIGN PATENT DOCUMENTS

| | | | |
|---|---|---|---|
| 2337052 | 7/1977 | France ................................ | 152/557 |
| 61-71204 | 4/1986 | Japan ................................. | 152/548 |

*Primary Examiner*—Donald E. Czaja
*Assistant Examiner*—Ramon R. Hoch
*Attorney, Agent, or Firm*—Stevens, Davis, Miller & Mosher

[57] ABSTRACT

A radial tire for high internal pressure, comprising a carcass having an innermost ply formed of nylon fiber cords and at least one ply of aramid fiber cords disposed outside the innermost ply, whereby the weight is able to be decreased without a sacrifice of durability.

6 Claims, 3 Drawing Figures

RADIAL TIRE FOR HIGH INTERNAL PRESSURE

BACKGROUND OF THE INVENTION

This invention relates to a pneumatic radial tire, more particularly to a radial tire for use on an aircraft or on a motorcycle, which entails travel under high internal pressure and has enhanced durability and decreased weight.

Generally, a tire for high internal pressure, particularly a radial tire for use on aircraft is subject to considerable deformation, because it is required to rotate at a high speed and to bear a large load. During such deformation, therefore, the carcass cords in the tire are exposed to a large compressive strain.

Conventional tires, therefore, have used organic fiber cords such as Nylon fiber cords which effectively withstand the compressive strain in the carcass. For a tire to retain required strength with organic fiber cords such as of Nylon, the number of plies of such organic fiber cords must be increased with the inevitable result that effective heat radiating is lowered and the overall tire weight is increased.

As a means for decreasing the wall thickness of the tire and lessening the tire weight, use of aromatic polyamide fibers in carcass cords has been proposed (see The Encyclopedia of Polymer Science and Technology Supplement, Volume 2, pages 84–86, John Wiley & Sons, Inc., copyright 1977) hereinafter referred to as aramid or Kelvar (registered trademark). Unfortunately aramids suffer from deficiencies in compressive strength in spite of high toughness, and, therefore, are unsuitable for use in aircraft tires which are destined to undergo heavy deformation.

BRIEF SUMMARY OF THE INVENTION

An object of this invention is to provide a radial tire which makes up for the aramids deficiencies in compressive strength and, at the same time, fulfills the need to enhance durability at high speed and to lessen weight.

DETAILED DESCRIPTION OF THE INVENTION

This invention is directed to a radial tire for high internal pressure, comprising: a carcass formed of a plurality of plies fastened in place with opposite ends thereof folded around a pair of laterally opposed bead cores; and a belt disposed radially outside the crown part of the carcass, characterized in that the carcass has an innermost ply of nylon cords and at least one ply of aramid fiber cords radially outside the innermost ply.

An example of this invention will be described in detail below with reference to the accompanying drawings.

Figure 1:
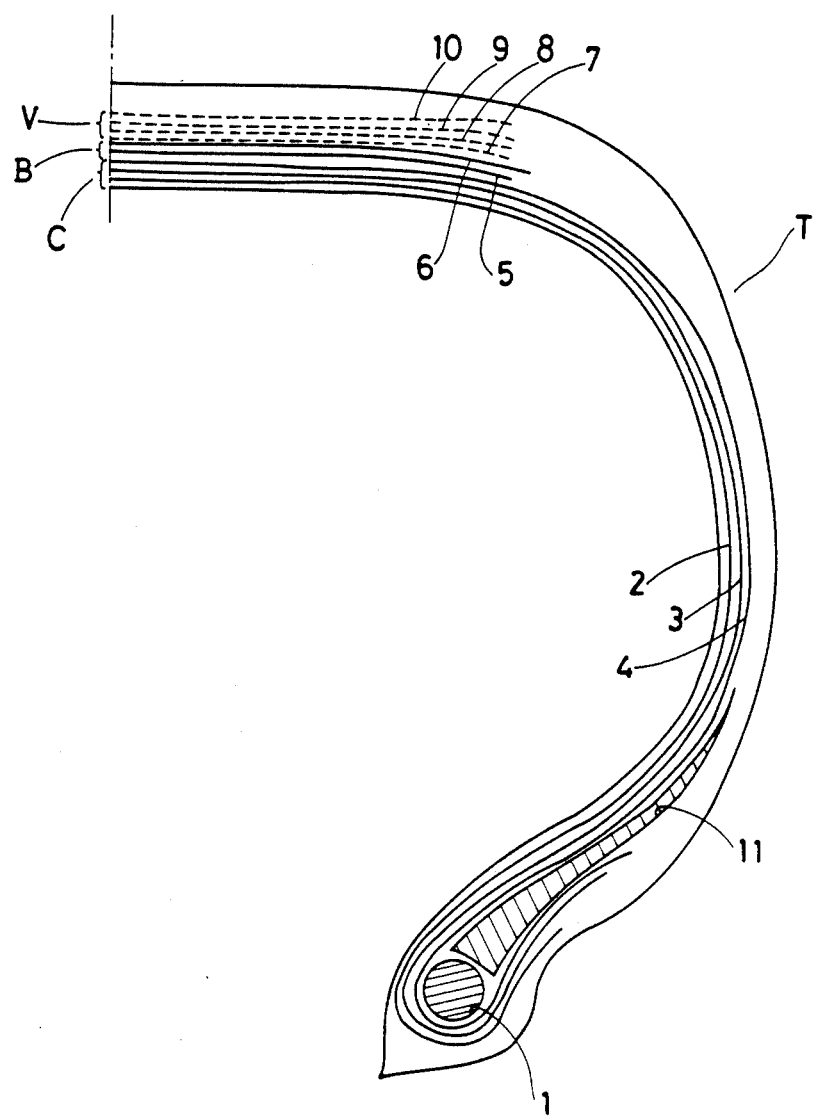
FIG. 1 is the right-hand half of a radial cross-section of a tire showing an example of this invention.

In FIG. 1, a radial tire T comprises: a carcass C, formed of three plies 2, 3 and 4, and folded outwardly around a bead core 1 from the axial inside to the axial outside; a belt or breaker layer B formed of two plies 5 and 6 disposed radially outside the crown part of the carcass C; and a band V formed of four plies 7, 8, 9 and 10 disposed radially outside the belt layer B. The innermost ply 2 of the carcass C is formed of nylon fiber cords possessing high compressive strength, and two outer plies 3 and 4 are formed of aramid fiber cords possessing high elasticity.

When the tire is deformed during travel, the ply on the radial inner side of the tire is mainly subject to compressive deformation and the plies on the radial outer side of the tire are mainly subject to expansive or tension deformation.

In this invention, the carcass C has a structure capable of amply enduring both compressive and tension deformation because the ply on the inner side of the tire carcass is made of nylon fibers strong enough to withstand compressive deformation and the plies on the outer side of the tire carcass are made of aramid fibers strong enough to withstand expansive or tension deformation. Optionally, nylon fiber cords may be used in a plurality of inner plies and aramid fiber cords used only in the outermost ply. The cords of the carcass C are arranged at an angle of 75° to 90° relative to the mid-circumferential or equatorial plane of the tire T, forming a radial or a semi-radial ply structure.

In this example, a belt or breaker layer B is disposed outside the crown part of the carcass C. The plies used in the belt layer B are formed of organic fiber cords such as of nylon, polyester, rayon, or aramid.

Generally in a tire used on aircraft, the crown part is heavily deformed in use, especially during landings. If this crown part incorporates plies made of highly rigid cords such as of steel, the deformation of the belt layer cannot follow the deformation of the carcass which adjoins the crown part, with the inevitable result that separation occurs between the two layers.

Therefore, it is desirable that the cords in the belt layer B are made of nylon, and the angle at which these cords are arranged relative to the mid-circumferential plane of the tire is selected in the range of 5° to 30°. Furthermore the number of plies in the belt layer B is selected to be in the range of 2 to 6.

In the example of FIG. 1, furthermore, it is preferred that a band V having cords arranged substantially parallel to the circumferential direction of the tire be disposed radially outside the belt layer B. This is because in a tire used on, for example, an aircraft which is used for high-speed travel, the band V serves to curb the occurrence of the so-called lifting, a phenomenon in which the crown part of a tire is caused by centrifugal force to protrude from the tire surface in consequence of high-speed rotation. In such a tire in band V, the cords are used in one to six plies and are made of organic fibers such as nylon, polyester, or rayon.

In this example, furthermore, a bead apex strip 11 is disposed between the carcass C and the turned-up portion of the carcass cords apex strip 11 is preferably made of a rubber of a hardness of 65° to 95° on the JIS A scale, or a combination of 65°–95° rubber and a more flexible rubber of a hardness of 50° to 65° on the JIS A scale.

EXAMPLE

Figure 2:
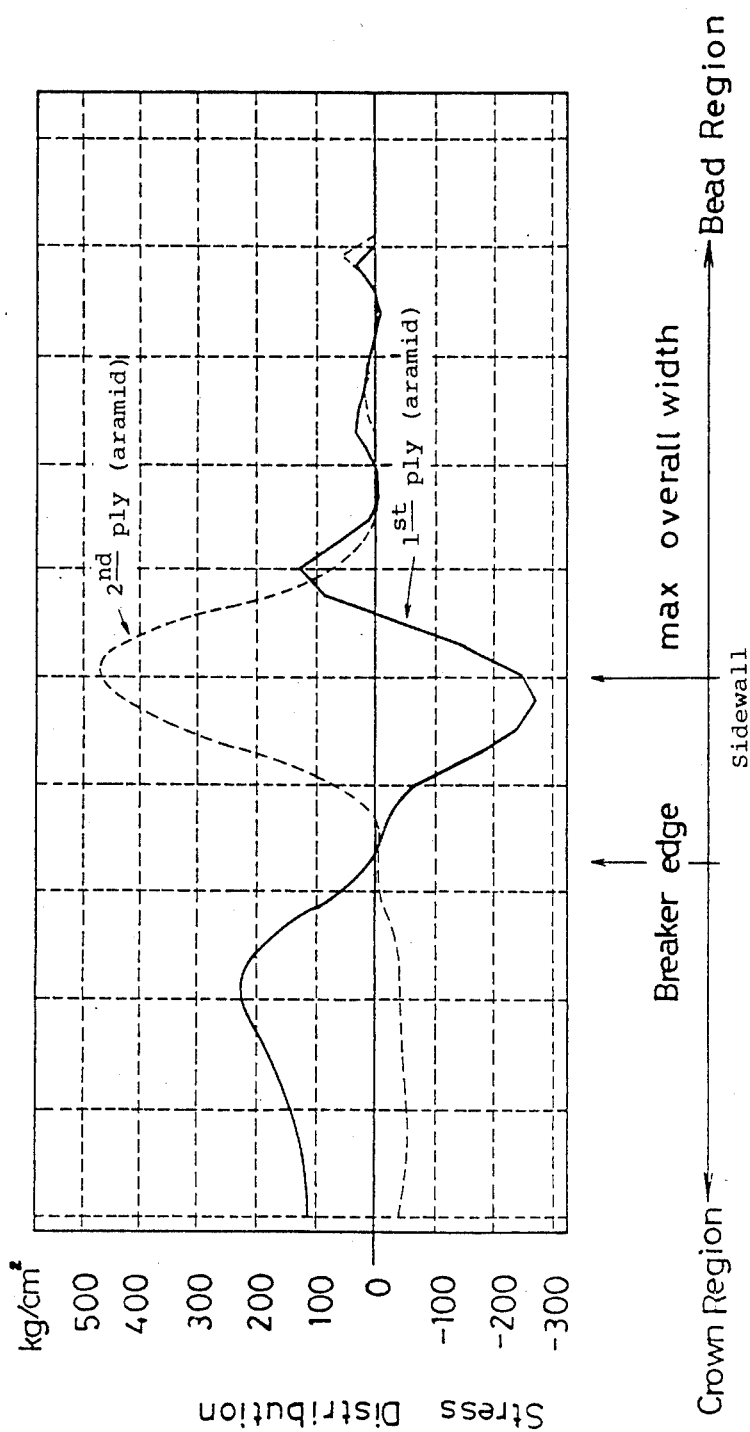
FIGS. 2 and 3 are graphs showing stress distribution in tire carcasses.
Figure 3:
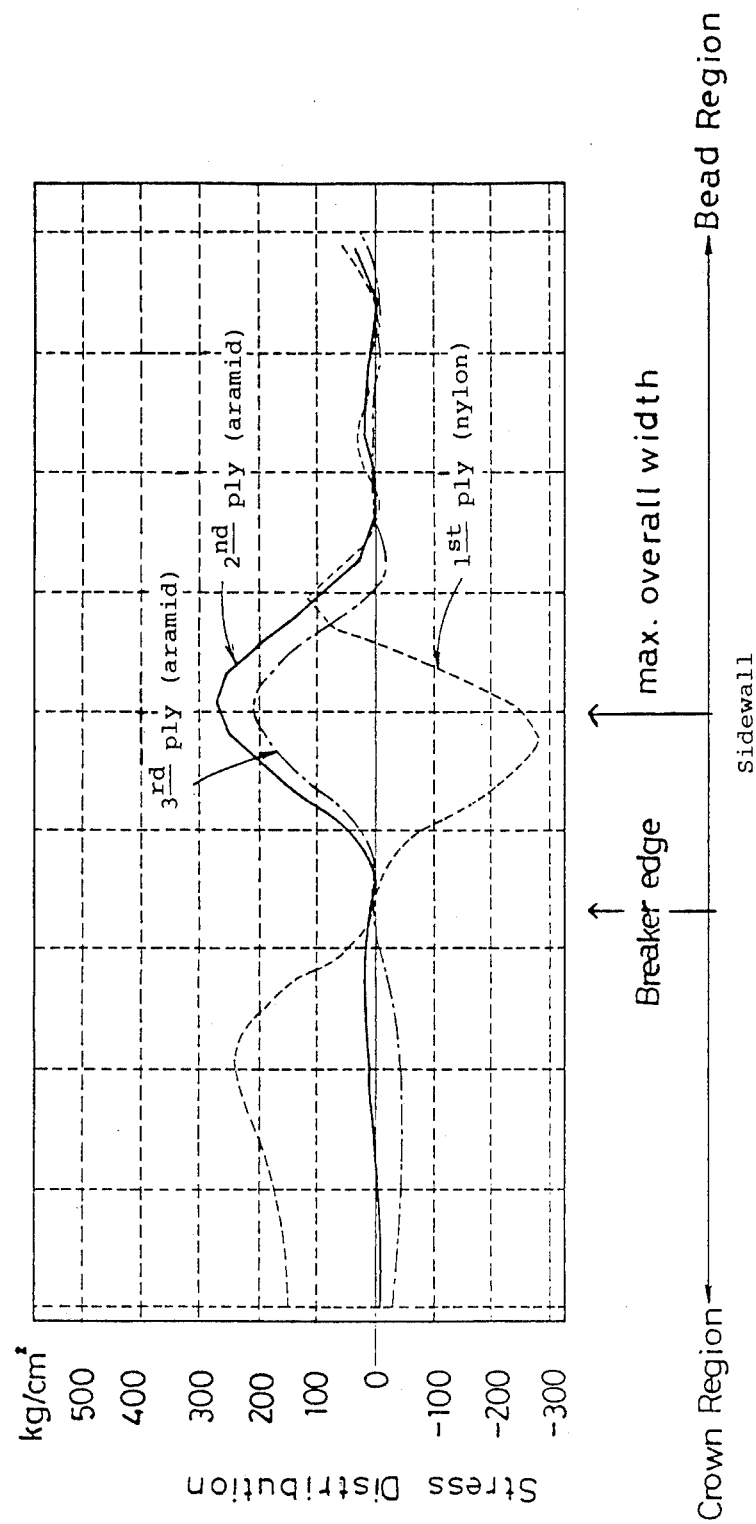

A tire, H46×18R20 in size, of the specifications indicated in Table 1, was manufactured as an experiment in the structure illustrated in FIG. 1 and was tested by the finite element method under the conditions of 13 kg/cm$^2$ of internal pressure and 18.8 tons of load to determine, through calculation, the stress distribution in the carcass. The results obtained in the working example of the present invention are shown in FIG. 3 and those obtained in Comparative Experiment 1 are shown in FIG. 2.

It is noted from the diagrams that in the tire of Comparative Experiment 1 which uses two plies, both of aramid fiber cords in the carcass, the ply on the radial inner side developed heavy discernible compressive stress in the sidewall region and that in the tire of the working example, none of the plies of aramid fiber cords developed any discernible compressive stress. From these results, it is inferred that the tire of the working example enjoyed notable improvement in durability.

Separately, the tires were subjected to a drum test, with the load fixed at a value two times that normally specified for such a tire, and the speed accelerated from 0 to 225 MPH over a period of 57 seconds. At the end of the test, the tires were visually examined for condition of damage and for evaluation of high speed durability. The results are shown in Table 1.

It is noted from Table 1 that the tire of the working example showed improved durability. The results of Table 1, further indicate that the tire of the working example showed notable weight decrease as compared with the conventional bias tire (Comparative Example 2).

As described above, the present invention provides a tire using nylon fiber cords durable to resist compressive stress in plies on the radial inner side of the carcass, and aramid fiber cords durable to resist expansive stress in plies on the outer side, and, therefore, enables the tire to enjoy notable weight decrease without a sacrifice of durability.

I claim:

1. A radial tire for high internal pressure, comprising:
   a carcass formed of a plurality of plies fastened in place by opposite ends thereof folded axially outwardly around a pair of laterally opposed bead cores; and
   a belt disposed outside the crown part of said carcass, said carcass having a radial innermost reinforcement ply of nylon fiber and at least one ply of aramid fiber cords positioned radially outside said innermost ply.

2. A radial tire according to claim 1, wherein a belt layer made of nylon cords is disposed outside the said crown part of the carcass.

3. A radial tire according to claim 2, wherein a band having cords arranged substantially parallel to the circumferential direction of the tire is disposed outside the belt layer.

4. A radial tire according to claim 1 in which the carcass plies are arranged at an angle of 75° to 90° with respect to the mid-circumferential plane of the tire.

5. A radial tire for high internal pressure comprising:
   a carcass having a plurality of plies fastened in place by opposite ends thereof being folded axially outwardly around a pair of laterally opposed bead cores; said carcass plies comprising a radial innermost reinforcement ply of nylon fibers having high compressive strength and two plies of aramid fiber cords having high elasticity positioned radially outside said innermost nylon ply; and
   a belt disposed radially outside said carcass plies around the crown region of said carcass.

6. A radial tire according to claim 5 in which the carcass plies are arranged at an angle of 75° to 90° with respect to the mid-circumferential plane of the tire.

TABLE 1

|  | Working Example (FIG. 3) | Comparative Example 1 (FIG. 2) | Comparative Example 2 |
|---|---|---|---|
| Carcass |  |  |  |
| Number of plies | 3 | 2 | 20 |
| Cord material(s) (in radially outward sequence) | Nylon/Aramid Aramid | Aramid/Aramid | Nylon |
| Denier | Nylon 1260d/3 Aramid 3000d/3 | 3000d/3 | 1260d/2 |
| Angle of cords (relative to the mid-circumferential plane of the tire) | 90° | 90° | 35° |
| Belt layer |  |  |  |
| Number of plies | 2 | 2 | 2 |
| Cord material | Nylon | Nylon | Nylon |
| Denier | 1980d/3 | 1890d/3 | 1890d/3 |
| Angle of cords (relative to the mid-circumferential plane of the tire) | 20° | 20° | 45° |
| Band |  |  |  |
| Number of plies | 4 | 4 | — |
| Cord material | Nylon | Nylon | — |
| Denier | 1890d/3 | 1890d/3 | — |
| Angle of cords (relative to the mid-circumferential plane of the tire) | 0° | 0° | — |
| Tire weight | 81.7 kg | 78 kg | 100 kg |
| Durability | Travel completed at 225 MPH | Burst in sidewall at 213 MPH | Travel completed at 225 MPH |